United States Patent
Sasaoka et al.

[11] Patent Number: 5,620,494
[45] Date of Patent: Apr. 15, 1997

[54] METHOD FOR MANUFACTURING OPTICAL FIBER COUPLER

[75] Inventors: Eisuke Sasaoka; Yuji Kobayashi; Tomomi Moriya; Yoichi Ishiguro; Shigeru Semura, all of Kanagawa, Japan

[73] Assignee: Sumitomo Electric Industries, Ltd., Osaka, Japan

[21] Appl. No.: 474,907

[22] Filed: Jun. 7, 1995

[30] Foreign Application Priority Data

Jun. 14, 1994 [JP] Japan .................................. 6-131669
Jun. 14, 1994 [JP] Japan .................................. 6-131671

[51] Int. Cl.$^6$ ..................... C03B 37/07; C03B 37/15; G02B 6/255
[52] U.S. Cl. ................ 65/377; 65/378; 65/384; 65/406; 65/408; 65/411; 264/1.25
[58] Field of Search ............... 65/377, 381, 384, 65/406, 407, 408, 409, 410, 501, 378, 411, 485, 488; 264/1.25

[56] References Cited

U.S. PATENT DOCUMENTS

| | | | |
|---|---|---|---|
| 4,763,272 | 8/1988 | McLandrich | 65/501 X |
| 4,765,816 | 8/1988 | Bjornlie et al. | |
| 5,009,478 | 4/1991 | Sasaki et al. | 65/411 X |
| 5,030,265 | 7/1991 | Suzuki et al. | 65/485 X |
| 5,167,685 | 12/1992 | Fukuma et al. | 65/411 |
| 5,176,730 | 1/1993 | Suganuma et al. | 65/42 |

FOREIGN PATENT DOCUMENTS 0499978 8/1992 European Pat. Off. .
0543456 5/1993 European Pat. Off. .

OTHER PUBLICATIONS

Patent Abstracts of Japan, vol. 012, No. 185 (P-710), May 31, 1988 & JP-A-62293209 (Nippon Telegr & Teleph Corp), Dec. 19, 1987.
Patent Abstracts of Japan, vol. 017, No. 513 (C-1111), Sep. 16, 1993 & JP-A-05-139771 (Fujikura Ltd), Jun. 8, 1993.
Ishiguro et al, "Tape-Shaped Optical Fiber Coupler", pp. 16-19.

*Primary Examiner*—David A. Simmons
*Assistant Examiner*—M. Curtis Mayes
*Attorney, Agent, or Firm*—Cushman Darby & Cushman, IP Group of Pillsbury Madison & Sutro, LLP

[57] ABSTRACT

The present invention provides a method for manufacturing an optical fiber coupler in which an optical fiber is elongated and heated by using a heating source under a constant tension. The heat source is controlled based on the ratio of a target elongating speed and an actual elongating speed of the optical fiber.

17 Claims, 2 Drawing Sheets

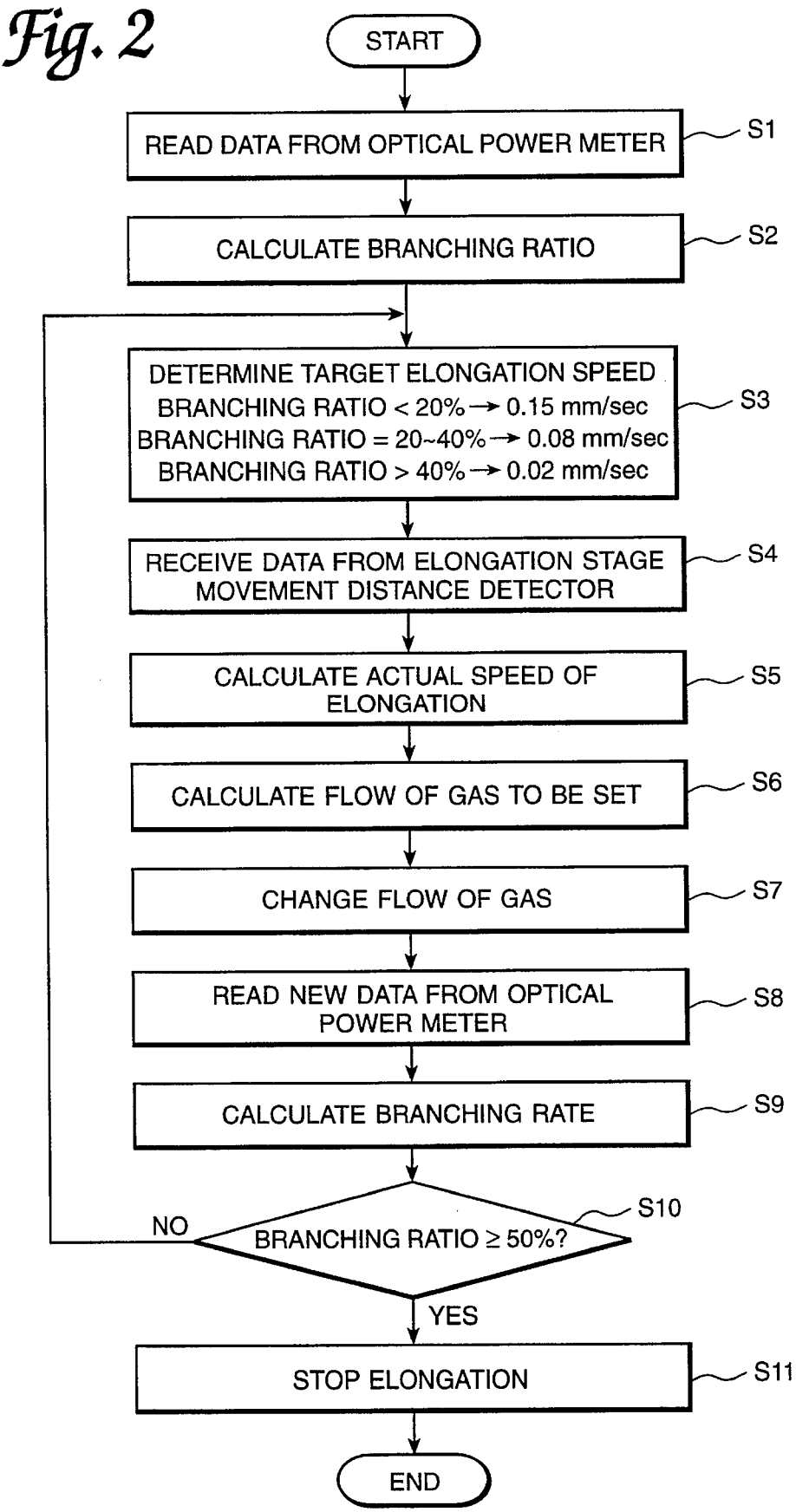

1

METHOD FOR MANUFACTURING OPTICAL FIBER COUPLER

BACKGROUND OF THE INVENTION

1. Field of the Invention

The present invention relates to a method for manufacturing an optical fiber coupler.

2. Description of the Related Art

An optical fiber coupler is a device for branching/coupling light among a plurality of optical fibers. At present, a fusion-elongation method is regarded as the most suitable method to manufacture an optical fiber coupler with single-mode optical fibers. In this fusion-elongation method, for example, the coatings of two optical fibers are removed in their predetermined sections so as to expose their bare fiber portions, and the bare fiber portions are heated to be fused while being brought into tight contact with each other by twisting or closely arranging in parallel with each other. Thereafter, a constant tension is given to the fused portion while its branching ratio is measured, and the fused portion is heated and elongated. When the branching ratio reaches a desired valve, the elongating is stopped, and the optical fibers are fixed to a protective member.

In the method for manufacturing an optical fiber coupler in which optical fibers are elongated while constant tensions are given thereto in such a manner as mentioned above, it is important to advance the elongating at a speed near a target elongating speed in order to obtain desired characteristics, or in order to prevent the optical fiber from being broken off because of excessive elongating. When the control of the elongating speed is not satisfactory, not only is it impossible to obtain desired characteristics, but also other problems occur, such as breaking of the optical fibers or the like. In addition, when the control is excessive, there is a problem that the elongating is not advanced, the elongating speed vibrates centering the target speed, or the like.

SUMMARY OF THE INVENTION

It is an object of the present invention to provide a method for manufacturing an optical fiber coupler in which optical fibers are elongated while constant tensions are applied thereto, and an actual speed of the elongating can be controlled suitably in accordance with a predetermined target speed of the elongating.

In order to accomplish the above object, the method for manufacturing an optical fiber coupler according to the present invention includes the steps of: tightly contacting bare fiber portions of a plurality of optical fibers; heating the bare fiber portions with a heating source to fuse them; elongating the optical fibers by heating with said heating source under a constant tension; measuring an actual elongating speed of the optical fibers; and controlling the heating source based on the ratio of a target elongating speed and the actual elongating speed.

According to the present invention, it is possible to elongate optical fibers while constant tensions are applied thereto, and to control an actual speed of the elongating suitably to a set target speed of the elongating. In addition, practicing the present invention can prevent the optical fibers from being broken off, and it is therefore possible to manufacture optical fiber couplers with less variations.

BRIEF DESCRIPTION OF THE DRAWINGS

In the accompanying drawings:

FIG. 2 is a flow chart for explaining the embodiment of the method for manufacturing an optical fiber coupler according to the present invention.

PREFERRED EMBODIMENTS OF THE INVENTION

Figure 1:
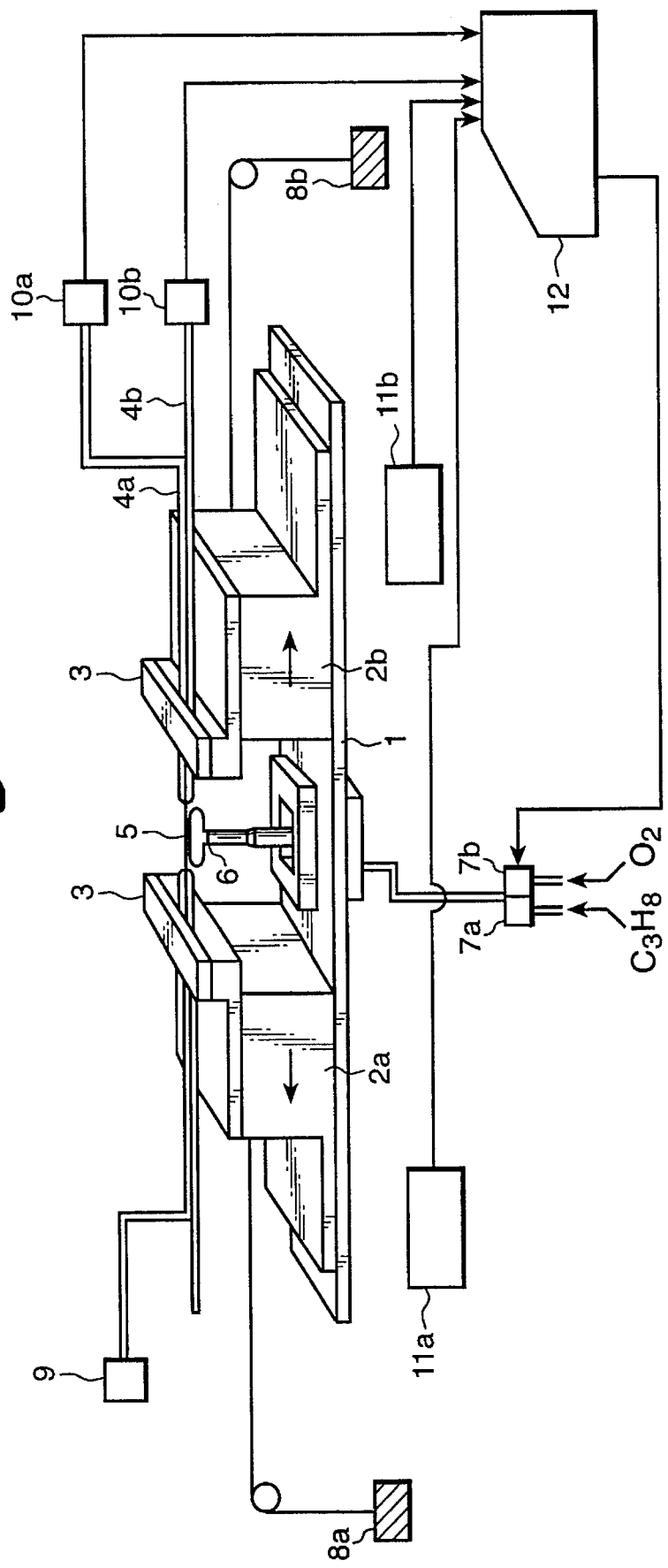
FIG. 1 is a schematic diagram of an optical fiber manufacturing apparatus to which an embodiment of the method for manufacturing an optical fiber coupler according to the present invention is applied.

The preferred embodiments of the present invention will be described referring with the accompanying drawings.

FIG. 1 is a schematic diagram of an optical fiber manufacturing apparatus to which an embodiment of the method for manufacturing an optical fiber coupler according to the present invention is applied. In the drawing, the reference numeral 1 represents a frame; 2a and 2b, elongating stages; 3, optical fiber clamps; 4a and 4b, optical fibers; 5, bare fiber portions; 6, a gas burner; 7a and 7b, gas flow controllers; 8a and 8b, weights for giving constant tensions to the optical fibers; 9, a light source; 10a and 10b, optical power meters; 11a and 11b, elongating stage displacement detectors; and 12, a computer.

Parts of the coating of the two optical fibers 4a and 4b are removed so that the bare fiber portions 5 are exposed. The coated portions of the two optical fibers are clamped by the optical fiber clamps 3. Since the optical fiber clamps 3 are attached to the elongating stages 2a and 2b respectively, constant tensions can be given to the optical fibers 4a and 4b by the weights 8a and 8b pulling the elongating stages 2a and 2b, respectively.

Monitoring light from the light source 9 is made incident to one of the optical fibers 4a and 4b, for example, to one end of the optical fiber 4a. The optical power meters 10a and 10b are connected to the other ends of the optical fibers 4a and 4b, respectively, so as to detect the power of the emitted light. The output signals based on the detected emitted light of the optical power meters are supplied to the computer 12 so that values of the characteristics of the optical fiber coupler, such as the insertion loss, the branching ratio, and the like, are calculated.

The gas burner 6 is a heat source for heating and fusing the bare fiber portions 5, and for heating and elongating the same. Propane gas and oxygen are supplied to the gas burner 6 so as to heat the bare fiber portions 5 by burning. The flow of the propane gas and oxygen are supplied to the gas burner 6 while being controlled by the gas flow controllers 7a and 7b, respectively. Accordingly, it is possible to control and to change the heating temperature of the optical fibers and the optical fiber coupler. The gas flow controllers 7a and 7b are controlled by the computer 12. In addition, it is possible to control and to change the heating temperature of the optical fiber and the optical fiber coupler by controlling the position of the gas burner or by controlling the temperature of the flame of the gas burner, which is controlled by the computer.

The elongating stage displacement detectors 11a and 11b detect the distances of movement of the elongating stages 2a and 2b, respectively relative to the frame 1. The detected output signals of the detectors 11a and 11b are supplied to the computer 12 so that the speed of elongating is calculated.

For example, an optical fiber coupler with the branching ratio of 50% is manufactured by this optical fiber manufacturing apparatus in the following manner.

Propane gas and oxygen are supplied to the gas burner 6, and the flow steams of the propane gas and oxygen are controlled by the gas flow controllers 7a and 7b, respectively, based on the instructions from the computer 12. The output signals of the elongating stage displacement detectors 11a and 11b and the output signals of the optical power meters 10a and 10b are supplied to the computer 12 so that the speed of elongating, the insertion loss of the optical fiber coupler, and the branching ratio are calculated by the computer 12. Although the target speed of elongating may be set in the computer a fixed value, the target speed in this embodiment is not set as a fixed value, but change during the elongating procedure. For example, the target speed was set to change by setting a specific target speed for each of three intervals of branching ratios. That is, 0.15 mm/sec when the branching ratio is in a range below 20%, 0.08 mm/sec when the branching ratio is in a range of from 20 to 40%, and 0.02 mm/sec when the branching ratio is 40% or more, are inputted in the computer in advance.

As for the method for controlling the gas flow streams, the gas flow streams are controlled in the process of elongating on the basis of the ratio of the target speed of elongating to the actual speed of the elongating in the state where the mixing ratio of propane gas and oxygen is kept constant.

The flow control for making the actual elongating speed follow the target elongating speed can be performed in a desired functional relationship. Preferably, in the case where a stable control system superior in following the target elongating speed is constituted, proportional control is performed by use of the functional relationship:

$$F=F_0 \times C(vt/va) \quad (1)$$

where F is a flow rate of gas after change, $F_0$ is a flow rate of gas before change, vt is a target elongating speed, va is an actual elongating speed and C is a constant.

It is also possible to use a power function expressed by:

$$F=F_0 \times (vt/va)^c \quad (2)$$

In the specific example, the value of the constant C is set as follows:

C=0.2 when vt (target elongating speed)>va (actual elongating speed); and C=0.4 when vt<va.

However, the constant C is not limited to these values.

Further, in the above cases, the gas burner is controlled so that the temperature of the optical fibers is increased when the value of the ratio (target elongating speed)/(actual elongating speed) exceeds a first predetermined value, and the temperature of the optical fibers is decreased when the value of the ratio is below a second predetermined value which may be equal to the first predetermined value or be different from it.

FIG. 2 is a flow chart for explaining an embodiment of the method for manufacturing an optical fiber coupler according to the present invention. The operation of the computer will be described mainly. After bare fiber portions of two optical fibers are heated and fused, the computer enters a process of elongating. The computer reads data from optical power meters (S1), and calculates a branching ratio (S2). The computer determines a target speed of elongating on the basis of the result of the calculation (S3). One of the three steps of the target elongating speed is selected as mentioned above in S3. The computer receives data from the elongating stage displacement detectors (S4), and calculates the actual speed of the elongating (S5). The flow of gas is calculated from the ratio of the target speed of the elongating to the actual speed of the elongating, and the gas flow controllers are controlled on the basis of the result of the calculation (S6). The flow of gas is determined, for example, by the functional relationship using the above-mentioned power function. The flow of gas is changed (S7) Then, the computer reads new data from the optical power meters (S8), and calculates a branching ratio (S9). The computer judges whether the result of the calculation becomes a desired branching ratio or not (S10), and returns to S3 to continue the elongating if the result of the calculation has not reached the desired branching ratio. If the branching ratio reaches 50% or more, which is a set target value in the step S10, the computer stops the elongating (S11), and terminates the process of elongating.

In order to confirm the advantage of the method according to the present invention using the ratio of the target elongating speed vt and the actual elongating speed v, the method was compared with a conventional method which uses the difference between the target elongating speed vt and the actual elongating speed va.

COMPARATIVE EXAMPLE

Ten optical fiber couplers with the branching ratio 50% were manufactured by the above optical fiber manufacturing apparatus which controlled the gas flow in accordance with the expression of:

$$F=F_0+B(vt-va) \quad (3)$$

where F is a flow rate of gas after change, $F_0$ is a flow rate of gas before change, vt is a target elongating speed, va is an actual elongating speed and B is a constant.

In addition, the target speed was changed over three steps, that is, 0.15 mm/sec when the branching ratio was in a range below 20%, 0.08 mm/sec when the branching ratio was in a range of from 20 to 40%, and 0.02 mm/sec when the branching ratio was 40% or more. Further, the value of the constant B was set to: B=5 when vt (target elongating speed)>va (actual elongating speed); and B=20 when vt<va.

The optical fiber couplers manufactured in this comparative example had branching ratios in the range of from 47.8% to 52.6%.

Moreover, in this case, if the constant B was made larger so as to bring the actual elongating speed close to the target elongating speed, the stability of the elongating speed could not be obtained and the elongating speed vibrated centering the target speed. Therefore, the smooth tapering shape of the coupler could not obtained and the loss of the coupler was increased.

EXAMPLE

Ten optical fiber couplers with the branching ratio of 50% were manufactured by the above optical fiber manufacturing apparatus which controlled the gas flow in accordance with the expression (2) of $F=F_0 \times (vt/va)^c$.

Also in this case, the target speed was changed over three steps, that is, 0.15 mm/sec when the branching ratio was in a range below 20%, 0.08 mm/sec when the branching ratio was in a range of from 20 to 40%, and 0.02 mm/sec when the branching ratio was 40% or more. Further, the value of the constant C was set to: C=0.2 when vt (target elongating speed)>va (actual elongating speed); and C=0.4 when vt<Va.

The optical fiber couplers manufactured in this example had the branching ratios in the range of from 49.5% to 50.7%. In this example, the optical fiber couplers having the branching ratio close to the target ratio could be stably manufactured.

Accordingly, it can be confirmed that the optical fiber couplers manufactured by using the ratio of the target and actual elongating speed is superior than the couplers manufactured by using the difference between the target and actual elongating speed.

In a case where the optical fiber coupler is manufactured by using the difference between the target and actual elongating speed, as the characteristic of the coupler approaches to a desired characteristic and the target elongating speed is made small, the difference between the target elongating speed and actual elongating speed also become small. Therefore, since it is hard to control the elongating speed as the characteristic of the coupler approaches to the desired one, it is difficult to stop the elongating of the coupler at the desired characteristic.

On the other hand, in a case where the optical fiber coupler is manufactured by using the ratio of the target and actual elongating speed, even if the characteristic of the coupler approaches a desired ratio, it is not difficult to control the elongating speed and to stop the elongating at the desired characteristic.

What is claimed is:

1. A method for manufacturing an optical fiber coupler comprising the steps of:

tightly contacting bare fiber portions of a plurality of optical fibers;

heating said bare fiber portions with a heating means to fuse said bare portions;

elongating said optical fibers by heating with said heating means under a constant tension;

measuring an actual elongating speed of said optical fibers; and determining a ratio of a target elongating speed to said actual elongating speed and controlling said heating means based on said ratio.

2. A method according to claim 1, wherein said controlling step further comprises increasing a temperature of said optical fibers when said ratio exceeds a first predetermined value, and decreasing said temperature of said optical fibers when said ratio is below a second predetermined value.

3. A method according to claim 2, wherein said increasing and decreasing of said temperature of said optical fibers is performed by moving said heating means relative to said optical fibers.

4. A method according to claim 2, wherein said increasing and decreasing of said temperature of said optical fibers is performed by controlling said temperature of said heating means.

5. A method according to claim 4, wherein said heating means is a gas burner, and wherein said step of controlling said temperature of said heating means is performed by controlling a flow rate of gas to said gas burner to change a temperature of a flame of said gas burner.

6. A method according to claim 5, wherein said step of controlling said flow rate of gas to said gas burner is controlled on the basis of the relationship of $F=F_o \times C(vt/va)$, where F is a flow rate of gas to said burner after said change, $F_o$ is a flow rate of gas to said burner before said change, vt is a target elongating speed, va is an actual elongating speed and C is a constant.

7. A method according to claim 6, wherein said constant C takes a different value depending on whether said flow of gas is increased on decreased.

8. A method according to claim 6, wherein said constant C is 0.2 when said target elongating speed is greater than said actual elongating speed, and further wherein said constant C is 0.4 when said target elongating speed is less than said actual elongating speed.

9. A method according to claim 5, wherein said step of controlling said flow rate of gas to said gas burner is controlled on the basis of the relationship of $F=F_o \times (vt/va)^c$, where F is a flow rate of gas to said burner after said change, $F_o$ is a flow rate of gas to said burner before said change, vt is a target elongating speed, va is an actual elongating speed, and C is a constant.

10. A method according to claim 9, wherein said constant C takes a different value depending on whether said flow of gas is increased on decreased.

11. A method according to claim 9, wherein said constant C is 0.2 when said target elongating speed is greater than said actual elongating speed, and further wherein said constant C is 0.4 when said target elongating speed is less than said actual elongating speed.

12. A method according to claim 1, further comprising changing said target speed on the basis of a length by which said optical fibers have been elongated by said elongating step.

13. A method according to claim 12, further comprising measuring said length by which said optical fibers have been elongated by said elongating step.

14. A method according to claim 12, further comprising measuring an insertion loss of said coupler to determine said length by which said optical fibers have been elongated by said elongating step.

15. A method according to claim 12, further comprising measuring a branching ratio of said coupler to determine said length by which said optical fibers have been elongated by said elongating step.

16. A method according to claim 1, further comprising reducing said target speed on the basis of a length by which said optical fibers have been elongated by said elongating step.

17. A method according to claim 1, further comprising changing said target speed on the basis of a branching ratio of said coupler such that said target speed is 0.15 mm/sec when said branching ratio is less than 20%, 0.08 mm/sec when said branching ratio is in a range of from 20% to 40%, and 0.02 mm/sec when said branching ratio is greater than 40%.

* * * * *